United States Patent [19]

McDonough

[11] Patent Number: 4,615,300
[45] Date of Patent: Oct. 7, 1986

[54] LITTER BOX LINER

[76] Inventor: John P. McDonough, 627 Brookline Blvd., Pittsburgh, Pa. 15226

[21] Appl. No.: 733,089

[22] Filed: May 13, 1985

[51] Int. Cl.[4] ............................................. A01K 29/00
[52] U.S. Cl. ......................................................... 119/1
[58] Field of Search ............................................ 119/1

[56]        References Cited
     U.S. PATENT DOCUMENTS

| 3,796,188 | 3/1974 | Bradstreet | 119/1 |
| 3,809,013 | 5/1974 | Rigney et al. | 119/1 |
| 4,030,449 | 6/1977 | Ruddick et al. | 119/1 |
| 4,312,295 | 1/1982 | Harrington | 119/1 |

Primary Examiner—Robert P. Swiatek
Attorney, Agent, or Firm—Webb, Burden, Robinson & Webb

[57]        ABSTRACT

A litter box liner includes a plurality of removable layers stacked one inside of the other and conformable to the shape of the interior surface of a litter box. The liner includes an imperforate bottom layer and a plurality of screening layers positioned above the bottom layer. Each screening layer includes a bottom wall with a plurality of openings therethrough which are large enough to pass granular litter but small enough to block animal excrement. The screening layer also includes an imperforate flap attached beneath the bottom wall by a flexible edge connector, with the flap being large enough to cover all of the openings. The animal excrement may be screened from the litter by pulling upward on the uppermost layer and allowing the litter to pass through the openings as the flap drops down.

13 Claims, 3 Drawing Figures

LITTER BOX LINER

BACKGROUND OF THE INVENTION

(1) Field of the Invention

This invention relates generally to litter boxes and, more particularly, to a plurality of removable and disposable layers which can be positioned between the litter box and the litter of a pet owner's preexisting litter box.

(2) Description of the Prior Art

The use of a litter box or the like for animals confined to a house or apartment is well known. In general, a pan or box is provided and contains a quantity of sand or other granular material such as a commercial kitty litter. The cleaning of such litter boxes is an unpleasant chore for most pet owners.

It is also known that the useable life of the granular litter may be extended by separating the solid animal waste or excrement from the litter. One rather unpleasant method of removing the animal exrement is by using a hand held scoop or a small strainer. A number of United States patents in the prior art disclose various litter box constructions for pets, particularly cats, in which the solid animal excrement can be separated therefrom to permit reuse of the litter. Examples of these prior art devices are shown in U.S. Pat. Nos. 2,963,003; 3,100,474; 3,796,188; 3,908,597; 4,217,857; 4,325,822; and 4,359,966. However, these prior art litter box arrangements are impractical to use and expensive to manufacture since they utilize complicated constructions involving the use of numerous component parts such as a plurality of receptacles, screen devices, and/or multiple partitions in a single apparatus.

Accordingly, it is an object of the present invention to provide an improved litter box arrangement which permits the separation of the solid animal waste from the granular litter to permit reuse of the litter and which is inexpensive to manufacture, is easy to use and permits quick separation of the granular litter from the excrement, with easy disposl of the separated excrement.

The granular litter has a limit as to the number of times it may be reused and will eventually need to be disposed of entirely. U.S. Pat. No. 3,141,441 discloses a litter box with a single screening structure disposed within a litter box for screening the excrement or other solid matter from the granular litter material or sand. However, after the litter has been screened only one time, the litter will be positioned immediately adjacent the litter box. To remove the litter from the box itself, the box must be handled in order to dump the litter, containing the animal excrement, into another container for disposal thereof. Such a procedure is unpleasant and time consuming and often results in the litter or excrement, or both, being spilled all over the floor. In addition, this arrangement permits the litter to be screened and reused only a single time.

U.S. Pat. No. 4,308,825 discloses litter box arrangements in which an additional layer or receptacle is placed between the litter box and the litter. By withdrawing this additional receptacle, the litter and excrement may be easily removed from the litter box. However, this device does not provide a means for easily removing the solid excrement from the litter to permit reuse of the litter. Indeed, U.S. Pat. No. 4,308,825 suggests the use of a shovel to remove the solid waste material.

Accordingly, it is another object of the present invention to provide a litter box arrangement which allows the solid excrement to be separated from the litter a number of times but which also allows the litter to be finally disposed of in a neat, clean and quick manner.

SUMMARY OF THE INVENTION

A litter box liner is adapted to be positioned between a litter box and the litter contained therein. The liner includes a plurality of removable, preferably disposable, layers stacked one inside of the other. Each layer is conformable to the shape of the interior surface of the litter box and has a bottom wall and a peripheral wall extending upwardly from the bottom wall and integral therewith. The liner includes an imperforate bottom layer and a plurality of screening layers positioned above the bottom layer. Each screening layer includes a bottom wall with a plurality of openings therethrough which are large enough to pass granular litter but small enough to block animal excrement. The screening layer also includes an imperforate flap attached beneath its bottom wall by a flexible edge connector. The flap is large enough to cover all of the openings in the bottom wall of the screening layer and keeps the litter from contacting any underlining layer.

The animal excrement may be screened from the litter by lifting upward on the uppermost screening layer and allowing the litter to pass through the openings as the flap drops down and away from the bottom wall on the screening layer. Preferably the peripheral wall of each screening layer is imperforate. The bottom layer and the bottom wall and peripheral wall of the screening layers are preferably formed of a thin plastic material. The flap may be formed of a fabric material suitable for absorbing liquids and the layers, including the flap, may include a deodorizing agent therein. The top portion of the peripheral wall of each layer may be bent outwardly and downwardly to form a lip.

DESCRIPTION OF THE PREFERRED EMBODIMENTS

Figure 1:
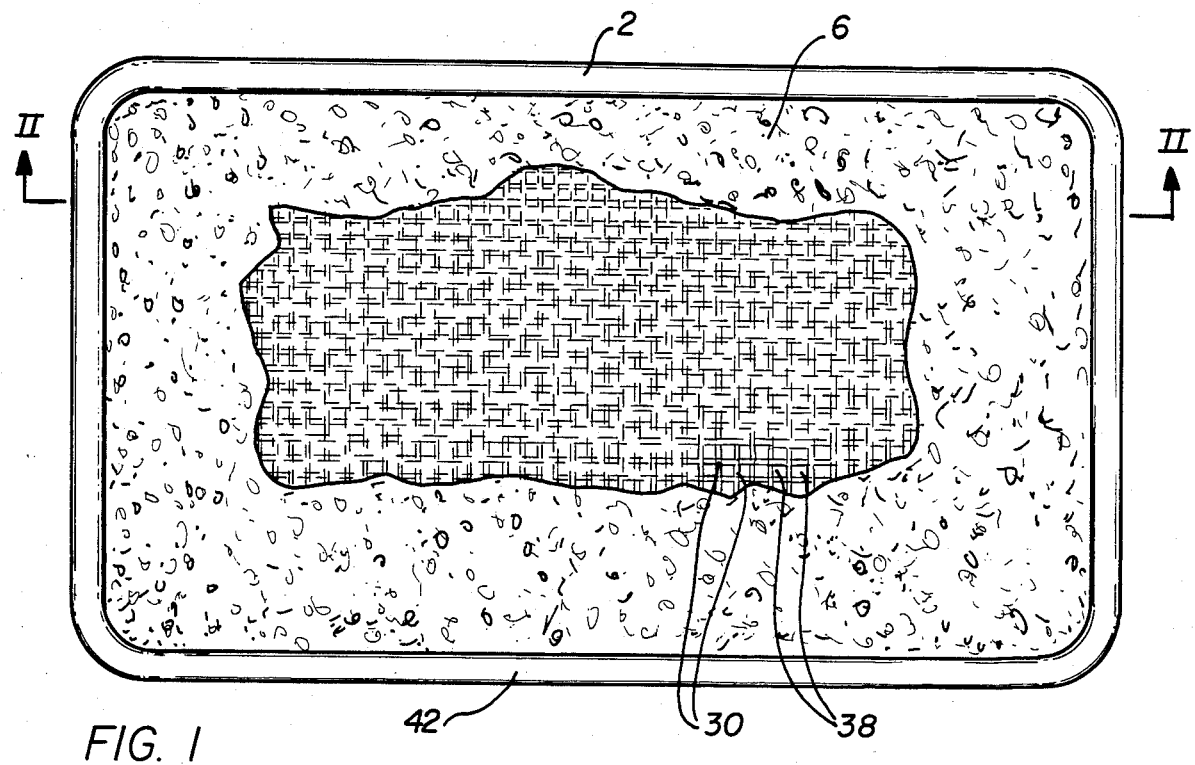
FIG. 1 is a top view of a litter box and liner arrangement in accordance with the present invention with a portion of the litter broken away.
Figure 2:
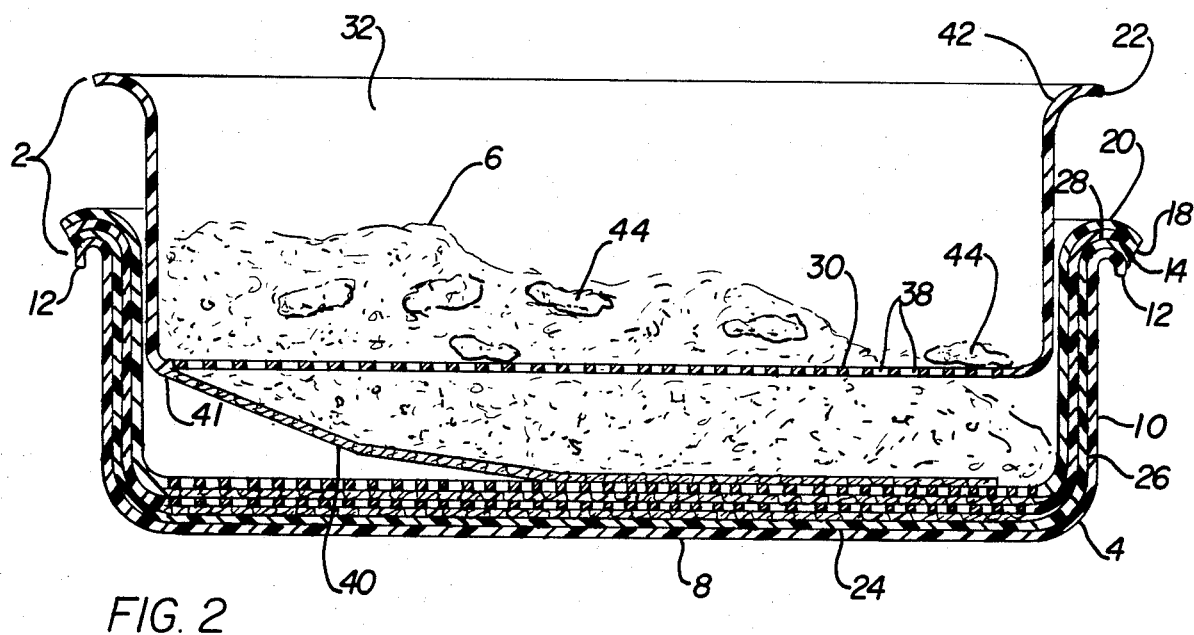
FIG. 2 is a section taken along lines II—II in FIG. 1 with the uppermost liner being removed.

A litter box with a liner in accordance with the present invention is shown in FIGS. 1 and 2. A litter box liner 2 is placed within and adjacent to a previously known and standard litter box 4 and a quantity of sand or other granular material, referred to as litter 6, is placed on top of the liner 2 within the litter box 4. The litter box 4 as shown is formed generally in the shape of an open topped rectangular container with a solid bottom wall 8 and peripheral wall 10 extending substantially perpendicular up from bottom wall 8 and integral therewith. The litter box 4 may also be formed in other configurations, such as a circular container, as is well known in the art. The upper portion of peripheral wall 10 may be bent outwardly and downnwardly to form a flange or lip 12 which enables the litter box 4 to be handled and which strengthens the upper portion of peripheral wall 10.

The liner 2 is formed of a plurality of stacked layers which conform to the configuration of the interior of the litter box 4 and are telescopically and removably placed within the litter box 4. The liner 2 includes an imperforate bottom layer 14 immediately adjacent the litter box 4 and a plurality of upper or screening layers stacked inside of and adjacent one another on top of the bottom layer 14. The configuration shown in FIG. 2 includes three screening layers, namely, screening layer 18, screening layer 20 and screening layer 22.

The bottom layer 14 is similar in shape to the litter box 4 itself and includes a solid bottom wall 24 and a solid peripheral wall 26 extending substantially perpendicularly from bottom wall 24 and integral therewith to form an open topped structure. The bottom layer 14 may be formed of a material which is thin, strong, and flexible enough to conform to the interior surface of the litter box 4, such as a plastic or fabric material, although a plastic material is preferred. The bottom layer 14 may also include a deodorizing agent therein to aid in reducing odors from the litter box 4. The upper portion of peripheral wall 26 of the bottom layer 14 may be bent outwardly and downwardly to form a lip 28. lip 28 enables the bottom layer 14 to fit securely over and be supported by lip 12 on the top of peripheral wall 10 of the litter box 4. In addition, lip 28 provides a handle enabling the bottom layer 14 to be easily grasped and removed from within the litter box 4.

Figure 3:
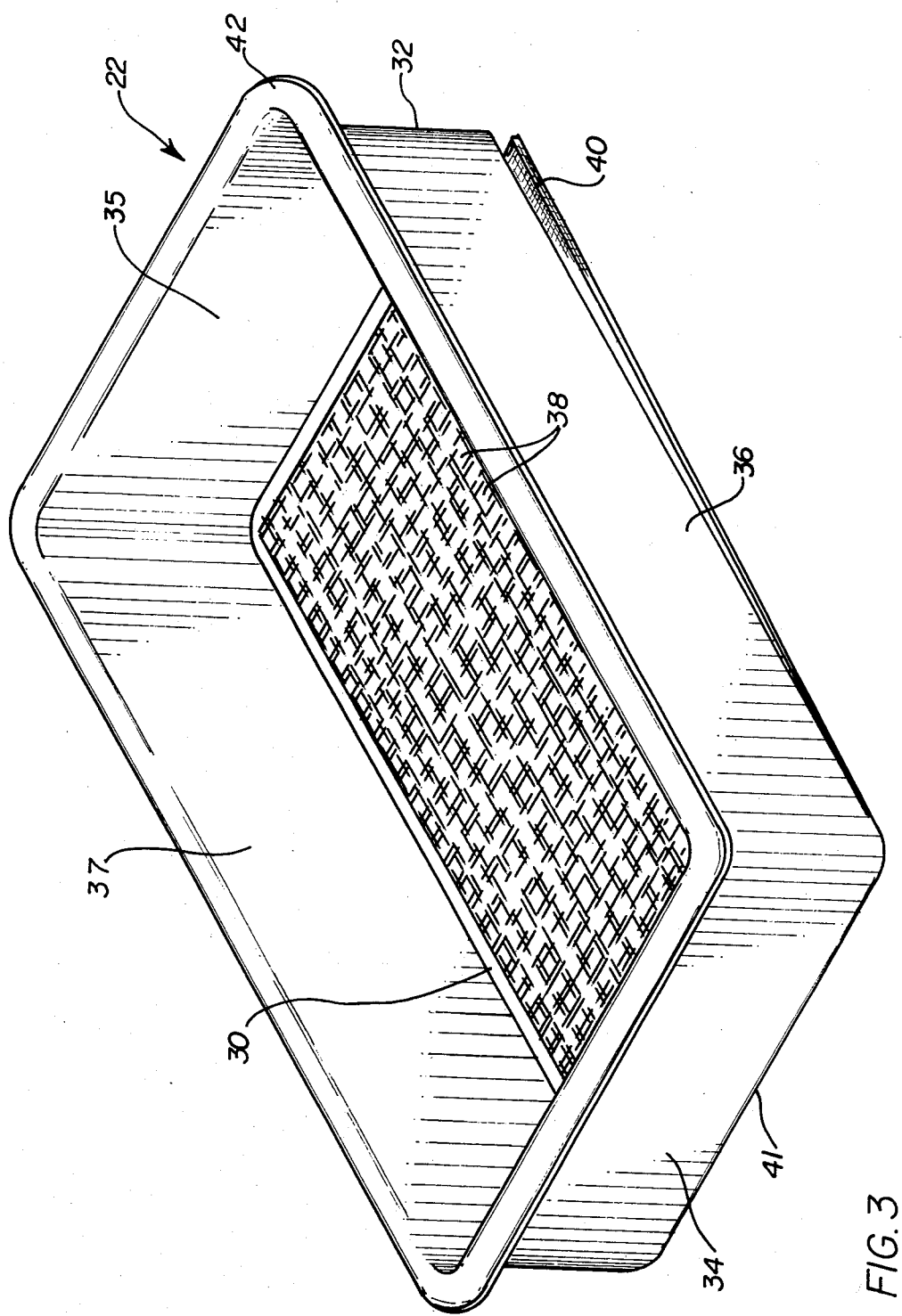
FIG. 3 is a perspective view of a single screening layer of the litter box liner shown in FIGS. 1 and 2.

Each screening layer is identical in configuration with each other, although screening layer 22 will be slightly smaller in overall dimension than screening layer 20 so that screening layer 22 can fit within screening layer 20. Likewise, screening layer 20 is slightly smaller than screening layer 18 and screening layer 18 is slightly smaller than the bottom layer 14. For clarity purposes, a single screening layer, namely, screening layer 22, is shown in FIG. 3 removed from the litter box 4 and from the other layers and without any litter 6 contained therein.

Screening layer 22 includes a bottom wall 30 and a peripheral wall 32 extending substantially perpendicular up from bottom wall 30 and integral therewith to form an open topped structure. Peripheral wall 32 is formed of end wall 34, end wall 35, side wall 36 and side wall 37, each connected along their adjacent edges and connected to bottom wall 30. The peripheral wall 32 is preferably solid and imperforate. Bottom wall 30 of screening layer 22 is formed as a screen or sieve which has a plurality of openings or holes 38 therethrough which are large enough to pass the granular litter 6 but small enough to block any solid waste contained in the litter 6.

Screening layer 22 also includes an additional layer or flap 40 positioned beneath bottom wall 30 and attached thereto be a flexible edge connector 41 adjacent one of the end walls 34 or 35 or side walls 36 or 37. As shown in FIG. 3, flap 40 is connected along bottom wall 30 of screening layer 22 adjacent end wall 34. Flap 40 is a flat, imperforate layer of the same approximate dimension and configuration as bottom wall 30 and completely covers all of the holes in bottom wall 30. The upper portion of peripheral wall 32 may be bent outwardly and downwardly to form a lip 42 therein. Lip 42 functions in a similar manner to lip 28 in the bottom layer 14.

Screening layer 22, is similar to the bottom layer 14, formed of a material which is thin, strong and flexible enough to conform to the interior surface of the litter box 4. Preferably, peripheral wall 32 and bottom wall 30 are made of plastic material and flap 40 is made of a fabric material. The flap 40 may also be advantageously formed of a material which will absorb urine or other liquids. The screening layers, including flap 40, may also include a deodorizing agent therein. In addition, the bottom layer 14 and screening layers are preferably formed to be easily disposable.

The use and advantage of the litter box liner of the present invention can be illustrated with reference to FIG. 2. The litter box liner 2, consisting of a bottom layer 14 and a plurality of screening layers, is placed within an empty and clean litter box 4. A quantity of litter 6 is then placed within the litter box 4 on top of the liner 2. The litter 6 will fall into the openings 38 in bottom wall 30 of screening layer 22, the uppermost layer, but is blocked by the solid, imperforated flap 40 from coming into contact with any underlying screening layers.

After the litter box has been utilized by an animal over a period of time, a quantity of solid waste or excrement 44 will be deposited in the litter 6. When it is desired to remove or screen the excrement 44 from the litter 6, lip 42 of screening layer 22 is grasped and screening layer 22 is pulled upwardly out of the litter box 4. Due to the force of gravity, the flap 40 will drop down out of the way along the flexible edge connector 41 and the granular litter 6 will pass down through the openings 38 in bottom wall 30 and on top of screening layer 20. The excrement 44 is too large to pass through the openings 38 and will be left behind in screening layer 22. Eventually all of the litter 6 will pass through the openings 38 and will be deposited, free of excrement 44, on top of screening layer 20. The removed screening layer 22, containing the excrement 44, can then be sealed and disposed of cleanly and efficiently.

This process can be repeated as many times as there are screening layers in the liner 2. Eventually, the litter 6 will be found laying adjacent the solid bottom layer 14. When it becomes necessary to change the litter 6, the bottom layer 14 is removed by grasping lip 28 and pulling upwardly thereon. The entire contents of the litter box 4, namely, litter 6 and excrement 44, will be removed entirely and contained within the bottom layer 14. The filled bottom layer 14 may be sealed and disposed of in a safe and clean manner without the litter 6 or excrement 44 ever being contacted and leaving a clean litter box 4.

Having described above the preferred embodiments of the present invention, it is to be understood that it may be otherwise embodied within the scope of the appended claims.

I claim:

1. A litter box liner adapted to be positioned between a litter box and the litter contained therein comprising: (a) a removable imperforate bottom layer which is conformable to the shape of the interior surface of the litter box and has a bottom wall and a peripheral wall extending upwardly from the bottom wall and integral therewith, and (b) a plurality of removable screening layers stacked one inside of the other and positioned above the imperforate bottom layer, each of said screening layers being conformable to the shape of the interior surface of the litter box and having a bottom wall and a peripheral wall extending upwardly from the bottom wall and integral therewith, with the bottom wall of each of said screening layers having a plurality of openings therethrough, said openings being large enough to pass granular litter therethrough but being small enough to block any solid animal waste in the litter, each of said screening layers including an imperforate flap attached thereto beneath its bottom wall by a flexible edge connector, said flap being large enough to cover all of said openings and keep the litter from contacting any underlying layer, and the solid animal waste may be removed from the litter by lifting up on the uppermost screening layer and allowing the litter to pass through said openings as said flap drops down.

2. The litter box liner of claim 1 wherein said bottom layer and screening layers are disposable.

3. The litter box liner of claim 2 wherein the peripheral wall of each screening layer is imperforate.

4. The litter box liner of claim 3 wherein the bottom layer and the peripheral wall and the bottom wall of said screening layers are formed of a plastic material.

5. The litter box liner of claim 2 wherein said bottom layer and screening layers include a deodorizing agent.

6. The litter box liner of claim 1 wherein the top portions of the peripheral walls of said bottom layer and screening layer are bent outwardly and downwardly to form a lip therein.

7. A litter box liner adapted to be positioned between a litter box and the litter contained therein comprising: (a) a removable imperforate bottom layer which is conformable to the shape of the interior surface of the litter box and has a bottom wall and a peripheral wall extending upwardly from the bottom wall and integral therewith, and (b) a plurality of removable screening layers stacked one inside of the other and positioned above the imperforate bottom layer, each of said screening layers being conformable to the shape of the interior surface of the litter box and having a bottom wall and a peripheral wall extending upwardly from the bottom wall and integral therewith, with the bottom wall of each of said screening layers having a plurality of openings therethrough, said openings being large enough to pass granular litter therethrough but being small enough to block any solid animal waste in the litter, each of said screening layers including an imperforate flap attached thereto beneath its bottom wall by a flexible edge connector, said flap being large enough to cover all of said openings and keep the litter from contacting any underlying layer, said flap being formed of a fabric material suitable for absorbing liquids, and the solid animal waste may be removed from the litter by lifting up on the uppermost screening layer and allowing the litter to pass through said openings as said flap drops down.

8. The litter box liner of claim 7 wherein said flap includes a deodorizing agent.

9. The litter box liner of claim 7 wherein said bottom layer and screening layers are disposable.

10. The litter box liner of claim 9 wherein the peripheral wall of each screening layer is imperforate.

11. The litter box liner of claim 10 wherein the bottom layer and the peripheral wall and the bottom wall of said screening layers are formed of a plastic material.

12. The litter box liner of claim 9 wherein said bottom layer and screening layers include a deodorizing agent.

13. The litter box liner of claim 7 wherein the top portion of the peripheral wall of said bottom layer and screening layers are bent outwardly and downwardly to form a lip therein.

* * * * *

UNITED STATES PATENT AND TRADEMARK OFFICE
CERTIFICATE OF CORRECTION

PATENT NO. : 4,615,300

DATED : October 7, 1986

INVENTOR(S) : John P. McDonough

It is certified that error appears in the above-identified patent and that said Letters Patent is hereby corrected as shown below:

Column 1 Line 42 "disposl" should read --disposal--.

Column 2 Line 65 "downnwardly" should read --downwardly--.

Column 3 Line 23 "lip" (second occurrence) should read --Lip--.

Column 3 Line 55 "be" should read --by--.

Column 4 Line 44 After "may" insert --then--.

Claim 6 - Column 5 Line 21 "layer" should read --layers--.

Signed and Sealed this

Twentieth Day of January, 1987

Attest:

DONALD J. QUIGG

*Attesting Officer*　　　*Commissioner of Patents and Trademarks*